(12) United States Patent
Schmitt et al.

(10) Patent No.: US 8,748,006 B2
(45) Date of Patent: Jun. 10, 2014

(54) SLIDE BEARING COMPOSITE MATERIAL

(75) Inventors: Holger Schmitt, Pfungstadt (DE); Thomas Enghof, Wiesbaden (DE); Daniel Meister, Mainz-Kastel (DE)

(73) Assignee: Federal-Mogul Wiesbaden GmbH, Wiesbaden (DE)

( * ) Notice: Subject to any disclaimer, the term of this patent is extended or adjusted under 35 U.S.C. 154(b) by 133 days.

(21) Appl. No.: 13/262,104

(22) PCT Filed: Mar. 10, 2010

(86) PCT No.: PCT/EP2010/053035
§ 371 (c)(1),
(2), (4) Date: Sep. 29, 2011

(87) PCT Pub. No.: WO2010/112309
PCT Pub. Date: Oct. 7, 2010

(65) Prior Publication Data
US 2012/0020592 A1    Jan. 26, 2012

(30) Foreign Application Priority Data
Mar. 31, 2009 (DE) .................. 10 2009 002 043

(51) Int. Cl.
| B22F 7/04 | (2006.01) |
| C22C 9/00 | (2006.01) |
| C22C 9/06 | (2006.01) |
| C22C 1/04 | (2006.01) |
| B23K 35/36 | (2006.01) |

(52) U.S. Cl.
USPC ........... 428/547; 428/548; 428/565; 428/698; 428/702; 75/247; 384/912; 384/913; 419/6; 419/23; 419/46; 420/485; 420/490

(58) Field of Classification Search
USPC ..................... 428/547, 610; 75/247
See application file for complete search history.

(56) References Cited

U.S. PATENT DOCUMENTS

| 4,505,987 A | 3/1985 | Yamada et al. | |
| 4,889,772 A * | 12/1989 | Bergmann et al. | 428/547 |
| 6,475,635 B1 * | 11/2002 | Sakai et al. | 428/553 |
| 6,676,704 B1 | 1/2004 | Pope et al. | |
| 6,787,100 B2 | 9/2004 | Toth | |
| 6,844,085 B2 * | 1/2005 | Takayama et al. | 428/674 |
| 6,905,779 B2 * | 6/2005 | Sakai et al. | 428/564 |
| 2002/0026855 A1 * | 3/2002 | Sakai et al. | 75/247 |
| 2004/0055416 A1 * | 3/2004 | Dunmead et al. | 75/244 |
| 2008/0102307 A1 * | 5/2008 | Zidar | 428/642 |

FOREIGN PATENT DOCUMENTS

| DE | 695 20 456 T2 | 10/2001 |
| EP | 1 541 23 A1 | 6/2005 |
| EP | 1 541 263 A1 | 6/2005 |
| JP | 63 024003 A | 2/1988 |

* cited by examiner

*Primary Examiner* — Gwendolyn Blackwell
*Assistant Examiner* — Seth Dumbris
(74) *Attorney, Agent, or Firm* — Robert L. Stearns; Dickinson Wright, PLLC

(57) ABSTRACT

The invention relates to a slide bearing composite material having at least one carrier layer and a sintered bearing metal layer. The sintered bearing metal layer is designed in at least one layer region as a gradient layer.

29 Claims, 2 Drawing Sheets

SLIDE BEARING COMPOSITE MATERIAL

BACKGROUND OF THE INVENTION

Technical Field

Figure 1:
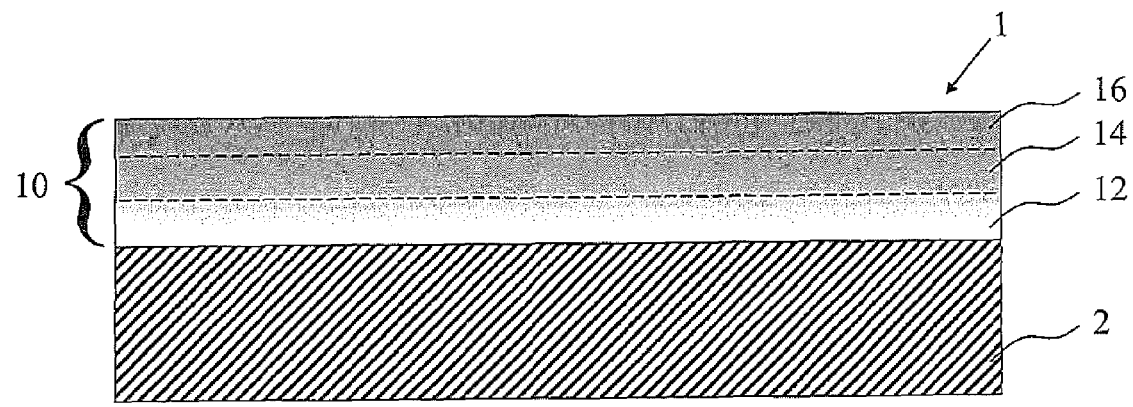

The invention relates to a friction bearing compound material.

DE 199 63 385 C1 describes a friction bearing compound material having a support layer, a bearing metal layer, a first intermediate layer consisting of nickel, and a second intermediate layer consisting of tin and nickel, as well as an antifriction layer consisting of copper and tin. Over in the course of use, the thickness of the antifriction layer decreases due to the migration of the tin which is associated with the concentration of the tin/copper particles. At the same time, the thickness of the nickel/tin layer increases, and the nickel layer decreases. The diffusion effects start under operating conditions and create a property gradient in the layer structure situated on the bearing metal layer.

U.S. Pat. No. 6,787,100 B2 discloses a method for producing a friction bearing having a multilayer system on a steel backing. The conventional bearing material is for example replaced by a substantially lead-free, two-layer system, wherein an uncompressed first layer consisting of a copper-based metal powder is initially applied to the steel backing, and a copper-based metal powder with a different composition is applied to this layer. Both layers are subjected to a first sintering step, cooled, compressed, and then subjected to a second sintering step. The metal powders of both layers are adapted to their specific tasks by adding additional components. The first sintered layer can accordingly consist of a Cu—Sn powder, and the second layer can consist of a Cu—Sn—Bi powder, where the first layer is formed thicker than the second layer. The goal of these measures is for example to replacing lead-containing bronzes.

Both layers are distinctly delimited from each other and form at best a thin transition zone at the interface between the two layers. No information is provided about the particle sizes of the powders.

SUMMARY OF THE INVENTION

The task of the invention is to create a friction bearing compound material with favorable sliding properties, very high thermal conductivity and a favorable shape-adapting and embedding ability.

The friction bearing compound material includes a sintered bearing metal layer that is formed as a gradient layer in at least one layer section.

A "gradient layer" is understood to be a layer with material properties that gradually change in the direction perpendicular to the support layer.

The formation of a gradient in the sintered bearing metal layer enables an even transition between the supporting and functionalized layer. The supporting layer is the support layer that for example can consist of a steel backing.

The functionalized layer is an antifriction layer located on the bearing metal layer, and the formation of the gradient in the sintered bearing metal layer also makes it possible to design the bearing metal layer with very good running properties at an increasing distance from the support layer, and this enables the elimination of a conventional additional antifriction layer.

The percentage of the gradient layer in the overall bearing metal layer is preferably at least 30% of the thickness of the bearing metal layer. 50% is a particularly preferable, and in a special embodiment, the gradient layer forms entire bearing metal layer.

The bearing metal layer preferably consists of a lead-free material. Powder materials are used such as metals, alloys and/or ceramic materials. Plastic materials are not used.

The bearing metal layer preferably consists of two sequentially applied sintered layers, wherein the first sintered layer is applied with a first powder material on the support layer, and the second sintered layer is applied with a second powder material on the first sintered layer, and the powder materials penetrate the layers while forming a gradient.

The number of applied layers is preferably 2-10 layers, and 2-4 layers are particularly preferable.

The powder material of the individual layers is sprinkled on, wherein at least the powder material of two layers is sprinkled on sequentially and sintered. If more than two layers are applied, additional powder material is subsequently applied sequentially and sintered. At the end of this part of the production process, all of the applied layers are compressed together.

The minimum sprinkled thickness per layer is 0.05 mm, and the thickness of the finished bearing layer is preferably 0.2 to 3 mm. When the thickness of the support layer of for example the steel backing is 0.4 to 4 mm, the overall thickness of the friction bearing compound material is 0.6 to 7 mm.

The penetration of the powder materials in the individual applied layers is preferably controlled by the particle size. For example, small particles can penetrate into the gaps between the larger particles of a layer underneath. The thickness of the penetration range can be adjusted depending on the formed particle sizes.

In the simplest case of two layers, a second layer consisting of small-grain material, i.e. a powder material with small particles, is sprinkled on a layer consisting of large-grain materials, i.e., a powder material with large particles, and the small particles can be completely absorbed in the material of the first layer. In addition to mechanical penetration into the gaps, diffusion effects during the sintering process can support the penetration of the materials.

A largely homogenous bearing metal layer is formed in this manner where the applied layers consisting of different powder materials cannot be distinguished from each other at the end of the production process. The "powder material" is therefore understood to be the sprinkled material.

The individual layers can be penetrated or mixed completely or only partially with the formation of layer sections where the thicknesses of the layer sections are greater than would be the case from the interface effects of adjacent layers. The percentage weight of the powder materials can change gradually from 0 to 100 weight percent for one powder material, or from 100 to 0 weight percent for the other powder material located in the first powder material over the entire thickness of the bearing metal layer.

This applies to the powder materials in general as well as for individual powder fractions of the powder materials.

The formation of gradient layers can ensure a very smooth transition between the supporting and functionalized layers or layer sections.

For example to better bond the bearing metal layer to the support layer, a buffers layer can be provided between the bearing metal layer and support layer, the buffer layer preferably consisting of the powder material that forms the largest percent by weight of the bearing metal layer.

The powder material of each sintered layer preferably has at least one first powder fraction consisting of a matrix material. A "matrix material" is preferably understood to be the material that has at least 50 weight percent of the powder material of the applied layer.

Although the term "matrix material" is used in relation to at least one other material, the powder material of a layer can consist exclusively of this matrix material, i.e., 100 weight percent of the powder material.

The powder material of each sintered layer preferably consists of only one matrix material where the matrix materials consist of the same material and the particle size of the matrix materials differs. The formation of the gradient is controlled exclusively by the differences in particle size of the two powder materials of the first and second layers.

The first powder fraction is preferably formed from particles with a large particle size or particles with a small particle size.

The percentage of small particles preferably increases in the bearing metal layer along with the distance from these support material.

The large particle size of the matrix material covers an average particle size range of >50 μm to >200 μm. When "small particle sizes" are mentioned, this means an average particle size of the powder material of the matrix material less than 50 μm.

The powder material of at least one sintered layer preferably has a second powder fraction consisting of at least on additive material. The profile of requirements is satisfied by adding at least one second powder fraction, and certain surface or interface properties can be created, for example to combine good running properties of the friction bearing composite material with ease of processing.

In the production of anti-friction elements made of the friction bearing composite material, other layers such as galvanic layers that need to be applied in different procedures can be eliminated.

Preferably, the first powder fraction of all the layers that are formed from the matrix material consists of the same matrix material, and this prevents the formation of cracks during the sintering process, for example under different sintering conditions.

The first powder fraction of the first sintered layer and/or the first powder fraction of the second sintered layer preferably consist of large particles.

According to another embodiment, the first powder fraction of the first sintered layer and/or the first powder fraction of the second sintered layer consist of small particles.

According to another embodiment, the second powder fraction of the first sintered layer and/or the second powder fraction of the second sintered layer consist of large particles. The average size of the large particles of the second powder fraction is preferably 70 to 90 μm.

It is also preferable for the second powder fraction of the first sintered layer and/or the second powder fraction of the second sintered layer to consist of small particles.

Another difference between the particles of the second powder fraction is their hardness.

The second powder fraction of the first sintered layer and/or the second powder fraction of the second sintered layer preferably consist of soft particles.

It is also possible for the second powder fraction of the first sintered layer and/or the second powder fraction of the second sintered layer to consist of hard particles.

The soft particles include that that for example are made of h-BN or C. Possible hard particles in particular consist of c-BN, $Al_2O_3$, $Fe_3P$, $MoSi_2$, $SiO_2$, metal nitrides, metal oxides or metal silicides.

The average particle size of the soft, large particles of the second powder fraction is preferably 6-8 μm.

The average particle size of the hard, small particles of the second powder fraction preferably ranges from 4-6 μm.

The first powder fraction forming the matrix material preferably consists of CuNiXSiX, CuSiXNiX, Cu and/or CuFeXPX. The value of the placeholder x can be 1-3.

A thin element layer is preferably applied on the bearing metal layer. This element layer can consist of the elements Cu, Sn, Bi, Ag, Au, Ni, In, Si or their alloys.

Applying a thin layer of an element powder on the metal layer can cause the element to defuse into the bearing metal layer during sintering, for example tin can diffuse into a bearing metal layer having a copper matrix. The gradient surface can therefore be specifically functionalized. The material can be optimally adapted to the corresponding profile of requirements.

A friction bearing element is preferably manufactured from the friction bearing composite material.

Figure 4:
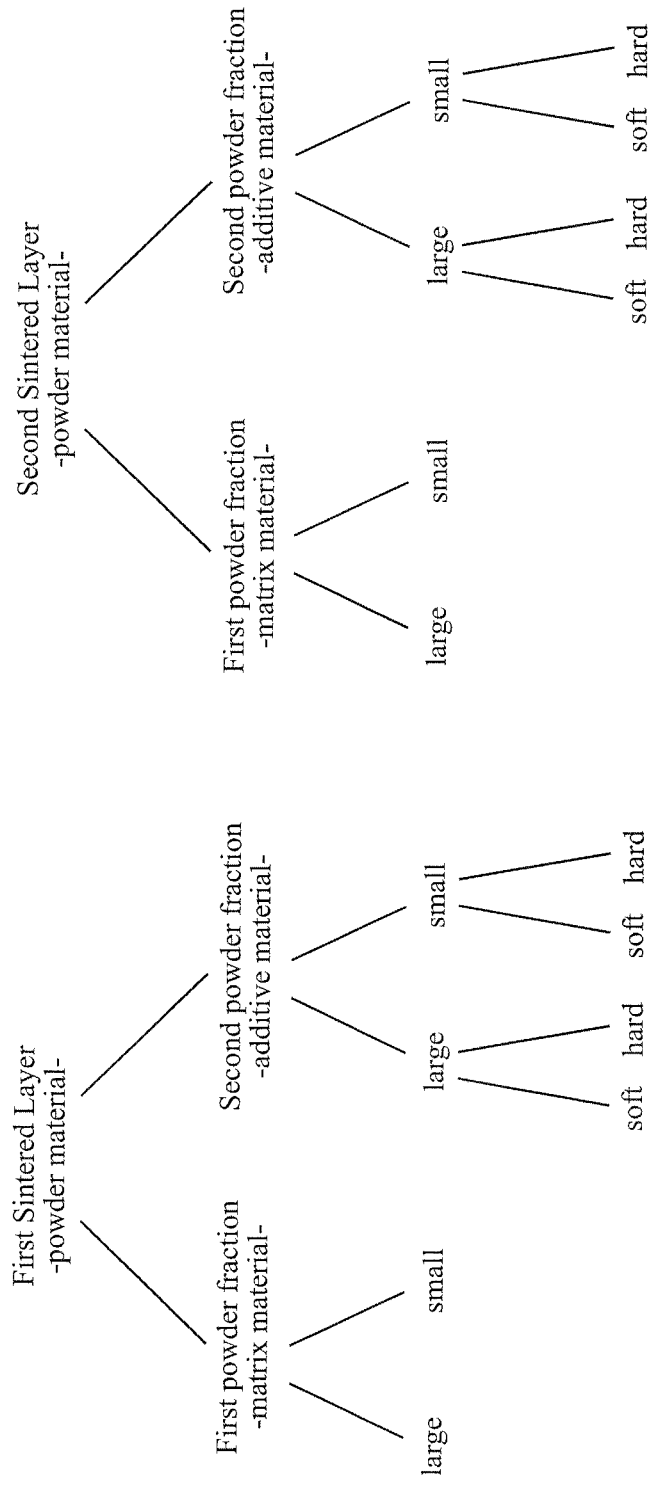

The different possible combinations in an example of two layers are shown in FIG. 4. When there are more than two layers, the diagram correspondingly changes.

Of the numerous possibilities, the 24 combinations in Table 1 are particularly preferred.

TABLE 2

| | $1^{st}$ sintered layer | | | | $2^{nd}$ sintered layer | | | |
|---|---|---|---|---|---|---|---|---|
| | Matrix material | | Additive material | | Matrix material | | Additive material | |
| | L | Sl | L | Sl | L | Sl | L | Sl |
| 1 | X | | | H | X | | St | |
| 2 | X | | | H | X | | | St |
| 3 | X | | St | | X | | | H |
| 4 | X | | | | | X | | |
| 5 | X | | | | | X | | H |
| 6 | X | | | | | X | | St |
| 7 | X | | | | | X | St | |
| 8 | X | | | | X | | St | |
| 9 | X | | | | X | | | St |
| 10 | X | | | | X | | | H |
| 11 | | X | St | | | X | | |
| 12 | | X | St | | | X | | H |
| 13 | | X | St | | | X | | St |
| 14 | X | | | | | X | St | |
| 15 | X | | | | X | | St | |
| 16 | X | | | | X | | | St |
| 17 | X | | | | X | | | H |
| 18 | | X | St | | | X | | |
| 19 | | X | St | | | X | | H |
| 20 | | X | St | | | X | | St |
| 21 | | X | St | | | X | St | |
| 22 | X | | | H | | X | | St |
| 23 | X | | | H | X | | St | |
| 24 | X | | | H | X | | | H |

L—large
Sl—small
X—present
St—soft
H—hard

In the first example, the first layer is hard which can be achieved by dispersion hardening. The second layer possesses favorable damping from the large, soft additives.

In the second example, the first layer corresponds to the first layer in the first example, but the second layer has favorable lubrication properties from the fine grain, soft additives.

In the third example, the first layer has favorable damping, whereas the second layer is formed hard.

In the fourth example, the first and second layer exclusively comprise matrix materials. There are no additional additives. The two powder materials are differentiated by the particle size distribution.

The fifth example has a first layer without additives and a second hard layer.

Examples 6-10 have a first layer without additives, where the second layer has either favorable lubrication properties and/or damping properties (examples 7 and 8).

In the ninth example, the second layer has very good lubrication, and the second layer is very hard.

In example 11, the first layer is characterized by favorable damping, and the second layer without additives is characterized by greater or lesser thermal conductivity.

In the 12$^{th}$ example, the first layer also possesses favorable damping, whereas the second layer is very hard.

The use of different particle sizes for the first powder fractions produces a chemical gradient between the layers. When the particle size distributions are the same in the first powder fractions, gradient can be adjusted by means of the chemical properties of the second powder fractions.

It is preferable to use only hard, small particles for the additives in all of the layers.

Large, hard additive particles can be used, but it is generally not useful because it excessively weakens the matrix material.

When large, soft additive particles are used, the damping effect of the entire friction bearing compound material is improved.

Using small, soft additive particles in a bottom layer is not useful because the solid lubrication effect cannot be realized there.

THE DRAWINGS

Examples of embodiments of the invention will be further explained below with reference to the figures.

Figure 2:
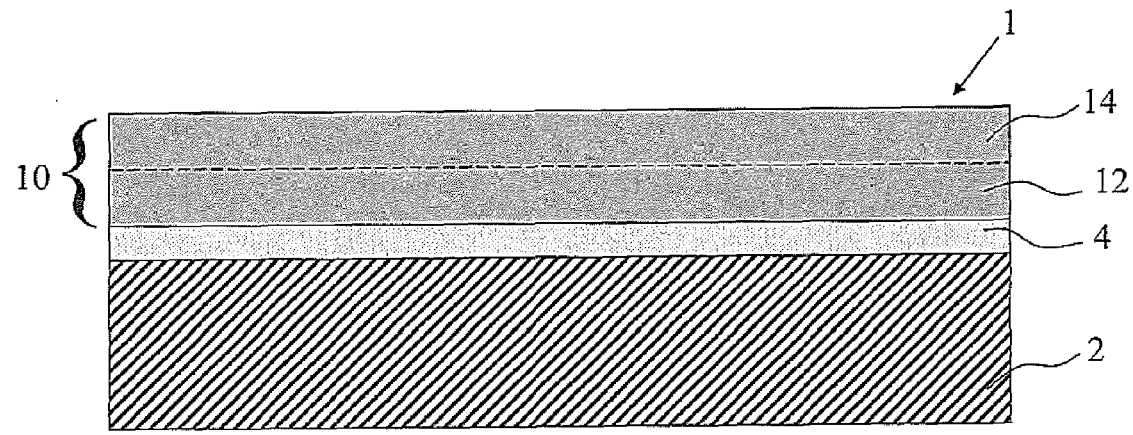

The following are shown:

FIG. 1 A schematic section of a friction bearing compound material according to a first embodiment, FIGS. 2+3 Sections of friction bearing compound materials according to a second and third embodiment; and FIG. 4 shows different possible combinations in an example including two sintered layers.

DETAILED DESCRIPTION

FIG. 1 shows a friction bearing compound material 1 having a steel backing 2 on which a bearing metal layer 10 is applied that is formed overall as a gradient layer. This bearing metal layer 10 is formed from three individual sintered layers 12, 14 and 16. Since the individual layers cannot be distinguished at the end of the production process, the dividing lines between the layers are only drawn as dashed lines.

FIG. 2 shows another embodiment in which the bearing metal layer 10 only consists of two layers 12 and 14, a buffer layer 4 being located between the bearing metal layer 10 and the support material 2. If the matrix material of the bearing metal layer 10 consists for example of CuSn8Ni and a solid lubricant as the second powder fraction, it is preferable to form the buffer layer 4 from this matrix material CuSn8Ni to improve the bond to the steel backing 2.

Figure 3:
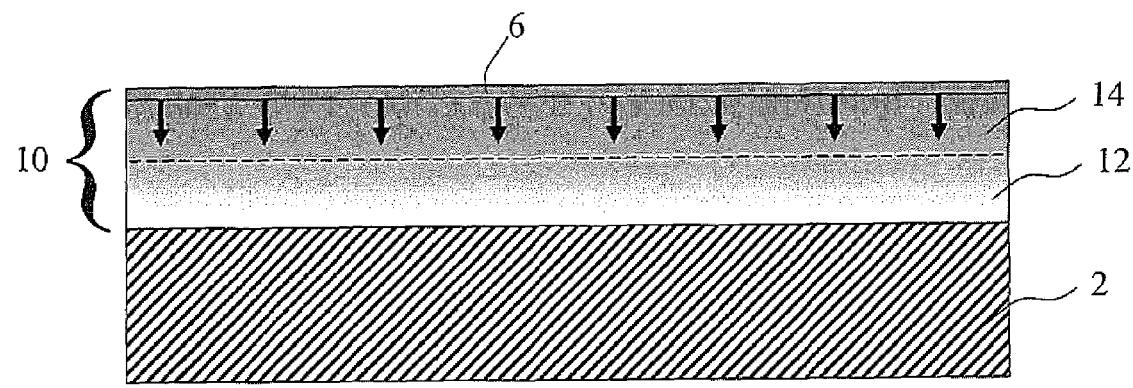

FIG. 3 shows another embodiment in which two layers were also used to produce the bearing metal layer 10. An element layer 6 is applied on the surface of the top, second layer and can penetrate into the top part of layer 14 during the sintering process. This forms an additional gradient of this element in the top layer, and layers 12 of 14 also have a gradient due to the different powder fractions.

The invention claimed is:

1. A friction bearing having at least one support layer comprising a steel backing and a sintered bearing metal layer, where the sintered bearing metal layer has a total thickness extending perpendicular to the support layer and comprises a gradient layer, wherein the gradient layer has a thickness extending perpendicular to the support layer, the thickness of the gradient layer is at least 30% of the total thickness of the bearing metal layer, wherein the gradient layer has at least one material property that increases continuously along the entire thickness of the gradient layer in a direction perpendicular to the support layer, wherein the bearing metal layer consists of at least two sequentially applied sintered layers, where the first sintered layer is applied with a first powder material on the support layer, the second sintered layer is applied with a second powder material on the first sintered layer, the second powder material penetrates into the first sintered layer to form the gradient layer, the first and second powder materials each comprise a first powder fraction and a second powder fraction, and wherein the first powder fraction of at least one of the first and second powder materials consists of particles which are larger in size than particles of the second powder fraction.

2. A friction bearing having at least one support layer comprising a steel backing and a sintered bearing metal layer, where the sintered bearing metal layer has a total thickness extending perpendicular to the support layer and comprises a gradient layer, wherein the gradient layer has a thickness extending perpendicular to the support layer, the thickness of the gradient layer is at least 30% of the total thickness of the bearing metal layer, wherein the gradient layer has at least one material property that increases continuously along the entire thickness of the gradient layer in a direction perpendicular to the support layer, wherein the bearing metal layer consists of at least two sequentially applied sintered layers, where the first sintered layer is applied with a first powder material on the support layer, the second sintered layer is applied with a second powder material on the first sintered layer, the second powder material penetrates into the first sintered layer to form the gradient layer, wherein the powder material of each sintered layer only consists of matrix material, the matrix materials consist of the same material, and the matrix materials differ according to particle size.

3. A friction bearing having at least one support layer comprising a steel backing and a sintered bearing metal layer, where the sintered bearing metal layer has a total thickness extending perpendicular to the support layer and comprises a gradient layer, wherein the gradient layer has a thickness extending perpendicular to the support layer, the thickness of the gradient layer is at least 30% of the total thickness of the bearing metal layer, wherein the gradient layer has at least one material property that increases continuously along the entire thickness of the gradient layer in a direction perpendicular to the support layer, wherein the bearing metal layer consists of at least two sequentially applied sintered layers, where the first sintered layer is applied with a first powder material on the support layer, the second sintered layer is applied with a second powder material on the first sintered layer, the second powder material penetrates into the first sintered layer to form the gradient layer, and wherein the first and second powder materials comprise at least one first powder fraction consisting of CuNiXSiX, CuSiXNiX, Cu and/or CuFeXPX, and X can assume the values 1-3.

4. The friction bearing of claim 1, wherein the thickness of the gradient layer is at least 50% of the total thickness of the bearing metal layer.

5. The friction bearing of claim 1, wherein the entire bearing metal layer consists of the gradient layer.

6. The friction bearing of claim 1, wherein the bearing metal layer consists of lead-free material.

7. The friction bearing of claim 1, wherein the first powder fraction consists of a matrix material.

8. The friction bearing of claim 1, wherein the particles which are larger in size have an average particle size range of >50 μm to <200 μm.

9. The friction bearing of claim 1, wherein the second powder fraction of at least one of the first and second powder materials consists of at least one additive material.

10. The friction bearing of claim 1, wherein a thin element layer is applied on the bearing metal layer.

11. The friction bearing of claim 1, wherein the first powder fraction of at least one of the first and second powder materials consists of particles which are smaller in size than particles of the second powder fraction.

12. The friction bearing of claim 9, wherein the first powder fraction of the first powder material consists of the particles which are larger in size than particles of the second powder fraction.

13. The friction bearing of claim 9, wherein the first powder fraction of the first powder material consists of the particles which are smaller in size than particles of the second powder fraction.

14. The friction bearing of claim 9, wherein the second powder fraction of the first powder material consists of the particles which are larger in size than particles of the first powder fraction.

15. The friction bearing of claim 9, wherein the second powder fraction of the first powder material consists of the particles which are smaller in size than particles of the first powder fraction.

16. The friction bearing of claim 9, wherein the second powder fraction of the first sintered layer and/or the second powder fraction of the second sintered layer consists of soft particles.

17. The friction bearing of claim 9, wherein the second powder fraction of the first sintered layer and/or the second powder fraction of the second sintered layer consists of hard particles.

18. The friction bearing of claim 16, wherein the soft particles consist of h-BN or C.

19. The friction bearing of claim 9, wherein the first powder fraction of the second powder material consists of the particles which are larger in size than particles of the second powder fraction.

20. The friction bearing of claim 9, wherein the first powder fraction of the second powder material consists of the particles which are smaller in size than particles of the second powder fraction.

21. The friction bearing of claim 9, wherein the second powder fraction of the second powder material consists of the particles which are larger in size than particles of the first powder fraction.

22. The friction bearing of claim 9, wherein the second powder fraction of the second powder material consists of the particles which are smaller in size than particles of the first powder fraction.

23. The friction bearing of claim 10, wherein the element layer consists of the elements Cu, Sn, Bi, Ag, Au, Ni, In, Si or their alloys.

24. The friction bearing of claim 11, wherein the percentage of the particles which are smaller in size in the bearing metal layer increases with the distance from the support layer.

25. The friction bearing of claim 11, wherein the particles which are smaller in size have an average particle size range of <50 μm.

26. The friction bearing of claim 12, wherein the particles which are larger in size have an average particle size of 70 to 90 μm.

27. The friction bearing of claim 16, wherein the soft particles of the second powder fraction have an average particle size of 6 to 8 μm.

28. The friction bearing of claim 17, wherein the hard particles of the second powder fraction have an average particle size of 4 to 6 μm.

29. The friction bearing of claim 17, wherein the hard particles consist of c-BN, $Al_2O_3$, $Fe_3P$, $MoSi_2$, $SiO_2$, metal nitrides, metal oxides or metal silicides.

* * * * *